United States Patent [19]

Elfverson

[11] Patent Number: 5,367,907

[45] Date of Patent: Nov. 29, 1994

[54] LIQUID LEVEL INDICATOR

[75] Inventor: Sven Elfverson, Mullsjö, Sweden

[73] Assignee: Scandmec AB, Sweden

[21] Appl. No.: 74,836

[22] PCT Filed: Nov. 21, 1991

[86] PCT No.: PCT/SE91/00790

§ 371 Date: Jun. 11, 1993

§ 102(e) Date: Jun. 11, 1993

[87] PCT Pub. No.: WO92/11514

PCT Pub. Date: Jul. 9, 1992

[30] Foreign Application Priority Data

Dec. 21, 1990 [SE] Sweden ................. 9004087

[51] Int. Cl.⁵ .............................. G01F 23/68
[52] U.S. Cl. ................................ 73/319; 73/313; 338/33
[58] Field of Search .............. 73/313, 319, 308; 338/33

[56] References Cited

U.S. PATENT DOCUMENTS

| | | | |
|---|---|---|---|
| 4,220,047 | 9/1980 | Mauboussin | 338/33 X |
| 4,641,523 | 2/1987 | Andreasson | 73/313 |
| 4,702,107 | 10/1987 | Guerrini et al. | 338/33 X |
| 5,020,366 | 6/1991 | Elfverson et al. | 73/313 |
| 5,129,261 | 7/1992 | Riley | 73/313 |

FOREIGN PATENT DOCUMENTS 0038894 11/1981 European Pat. Off. .
3834986 4/1990 Germany .
460451 10/1989 Sweden .

Primary Examiner—Diego F. F. Gutierrez
Attorney, Agent, or Firm—Lerner, David, Littenberg, Krumholz & Mentlik

[57] ABSTRACT

A liquid level indicator comprising a rod (10) of insulating material. The rod is a carrier for two parallel helically wound resistance wires (12, 13) and is surrounded by a float (11) of insulating material displaceable along the rod (10) by variations in the liquid level. The resistance wires are connected to electrically conducting contact by means of a contact element (14) arranged on the float (11) with resilient contact plates arranged on each side of the rod for respective resistance wires. In this manner a circuit through the wires (12, 13) and the contact element is achieved whose resistance varies depending on the position of the float (11) along the rod (10). In order to improve the float's ability to follow variations in the liquid level, the contact element (14) is pivotably carried on the float (11) so that the contact element can pivot somewhat about an axis which normally is directed transversely to the longitudinal direction of the rod (10).

10 Claims, 2 Drawing Sheets

LIQUID LEVEL INDICATOR

TECHNICAL FIELD

The present invention relates to a liquid level indicator comprising a rod of insulating material, which rod is a carrier for two parallel helically wound resistance wires and is surrounded by a float of insulating material displaceable along the rod by variations in the liquid level, which resistance wires are connected to electrically conducting contacts by means of a contact element arranged on the float with a resilient contact plate on each side of the rod for respective resistance wires to achieve a circuit through the wires and the contact element, whose resistance varies depending on the position of the float along the rod.

BACKGROUND ART

A liquid level indicator of the type mentioned above is known from SE 460 451 and is principally used in fuel tanks in vehicles. It is normal that the contact element is rigidly affixed to the float. This implies that the side forces which act on the float as it is displaceably carried with a certain clearance on the rod must be completely accommodated by the resilient contact plates. The side forces arise for example from mass-induced forces during cornering, acceleration and braking. It is important that the contact plate which is not acted upon during full sideways force does not lose contact with "its" helical wire. Thus, a relatively high contact pressure must be used for these contact elements. Because of the friction between the contact plates and the windings, the float is not so easily displaced along the rod.

Technical Problem

It is therefore an object of the invention to provide a liquid level indicator in which the contact plates maintain an equal contact pressure on both sides of the rod, independent of the external forces which affect the sender.

Solution

This is achieved according to the invention in that the contact element is pivotably carried on the float so that the contact element can rotate a little about an axis which normally extends transversely to the longitudinal direction of the rod. By means of this pivotability, compensation for side forces can be provided whilst still maintaining an unchanged contact pressure against both sides of the rod.

In one embodiment of the present invention, a liquid level indicator is provided which may comprise elongated guide element means having a vertical axis for providing a vertical guide path along the particular volume of liquid to be monitored. The liquid level indicator may also include electrically conductive wire helically arranged on the elongated guide element means with respect to the vertical axis extending therethrough. The electrically conductive wire should preferably extend along the vertical guide path provided by the elongated guide element means. Float means may be arranged for vertical movement along the vertical axis of the elongated guide element means to adapt to varying levels of the volume of liquid to be monitored. To complete the structure of the present liquid level indicator, a contact element may be pivotably mounted on the float means about a horizontal axis extending generally transverse to the vertical axis of the elongated guide element means. The contact element should be electrically conductive and preferably includes at least one contact plate arranged in correspondence with the conductive wire so that a circuit is formed which permits current to flow between the conductive wire and the contact element. The resistance of this circuit may vary in accordance with the relative position of the float means along the elongated guide element means.

In a preferred embodiment, the float means of the liquid level indicator may include a pair of bearing pins arranged at opposite sides thereof. It is also preferable for the contact element to comprise a pair of fastening rings arranged at opposite sides thereof so that the fastening rings may be mounted on respective ones of the pair of bearing pins to obtain the pivotable mounting of the contact element on the float means.

In another preferred embodiment, the contact element may comprise a main body and a pair of flexible arms extending from opposite sides of the main body. In this preferred embodiment, the flexible arms will also be used to connect the fastening rings to the main body. As clearly shown in FIG. 1, each of the fastening rings may define a sized and shaped aperture having a diameter slightly larger than the diameter of the corresponding bearing pins on which the fastening rings are mounted. This arrangement will permit the contact element to pivot about the horizontal axis upon exertion of a predetermined force thereon.

In another preferred embodiment, the elongated guide element means may comprise a rod having an oval cross-section. As clearly shown in FIG. 1, the cross-sectional area of the rod will preferably extend in a plane arranged generally transverse to the vertical axis extending through the rod. It is also preferable for the main body of the contact element to define a sized and shaped aperture having an area greater than the cross-sectional area of the rod so that the rod can extend therethrough, as shown in FIG. 1.

According to a preferred embodiment of the invention, the contact element is stamped from a piece of thin plate with two bearing lobes arranged at a distance from each other, which lobes are intended to be carried by two diametrically opposed bearing pins, one on either side of the float.

The bearing lobes are suitably connected to the contact plates by two elastically formed extension pieces.

According to a further advantageous embodiment of the invention, the rod has an oval cross-section, the float has means which prevents it from rotating around the rod and the bearing axis for the contact element is substantially in alignment with the largest cross-section of the rod.

BEST MEANS OF CARRYING OUT THE INVENTION

Figure 1:
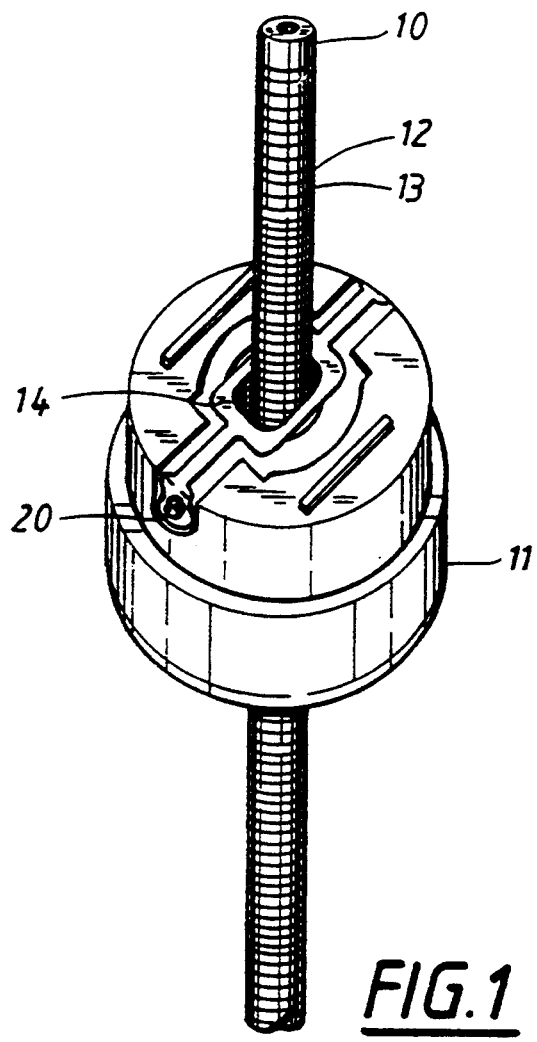
FIG. 1 is a perspective view which shows the liquid level indicator according to the invention.
Figure 2:
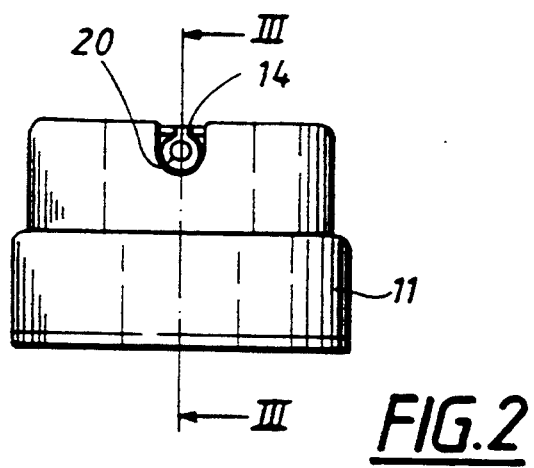
FIG. 2 is a side view of the float included in the liquid level indicator.

As can be seen from FIG. 1, the liquid level indicator includes a rod 10 with an oval cross-section and a ring-shaped float 11 surrounding the rod, which float is vertically displaceable along the rod depending on variations in the liquid level in the vessel in which the level indicator is mounted. Both the rod and the float are made from insulating material such as plastic.

The rod is a carrier for two parallel helically wound resistance wires 12, 13, which resistance wires are connected to electrically conducting contact plates 15, 16 which extend from a contact element 14 arranged on the float. The contact plates 15, 16 may be resilient and are preferably arranged on each side of the rod for completing an electrical connection to respective resistance wires.

The contact element 14 is therefore used to achieve an electrical contact between the two resistance wires whereby the length of the wires, i.e. the float's position along the rod, can be detected by measuring the resistance through the circuit. The value of the resistance is used to indicate the liquid level by means of a not shown indicating means.

The resistance wires 12, 13 are mounted in a known way on the oval rod 10 so that one of the wires is recessed in the rod surface on the one side of the rod, whilst the other wire is recessed in the rod surface on the other side. This ensures that the one contact plate 15 only makes contact with the one wire 12, whilst the other plate 16 can only make contact with the other wire 13.

Figure 3:
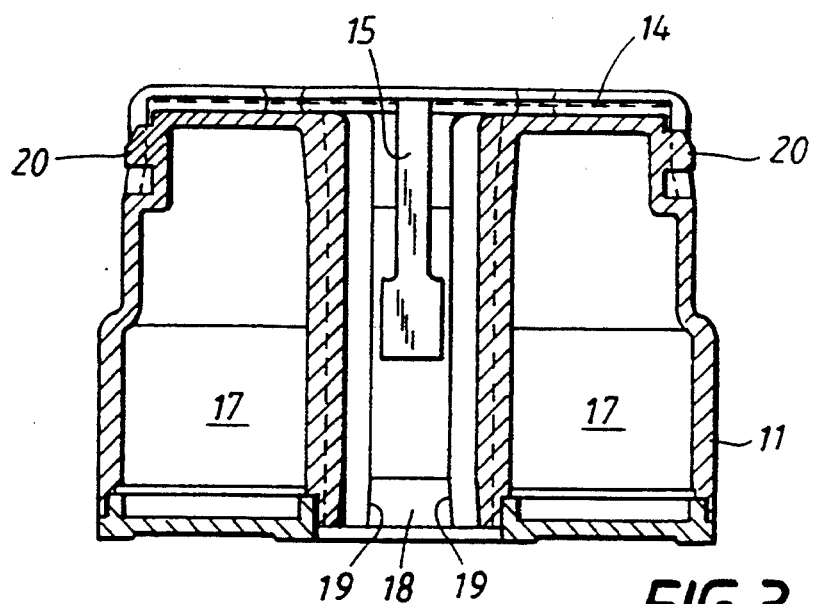
FIG. 3 is a section along line III—III in FIG. 2.

The circular float 11 has a ring-shaped cavity 17 and a central through-passage 18 with longitudinally extending rails 19 which define an oval passage with precise clearance for the rod 10, which prevents the float 11 from rotating about the vertical axis of the rod 10. The float is provided with two bearing pins 20 arranged on diametrically opposite sides of the float for the contact element 14 which is carried with a small clearance on these pins 20 so that it can pivot somewhat about the pins. From FIG. 3 it can be seen that the contact plates extend below the pins 20 for about approximately half the float's length.

Figure 4:
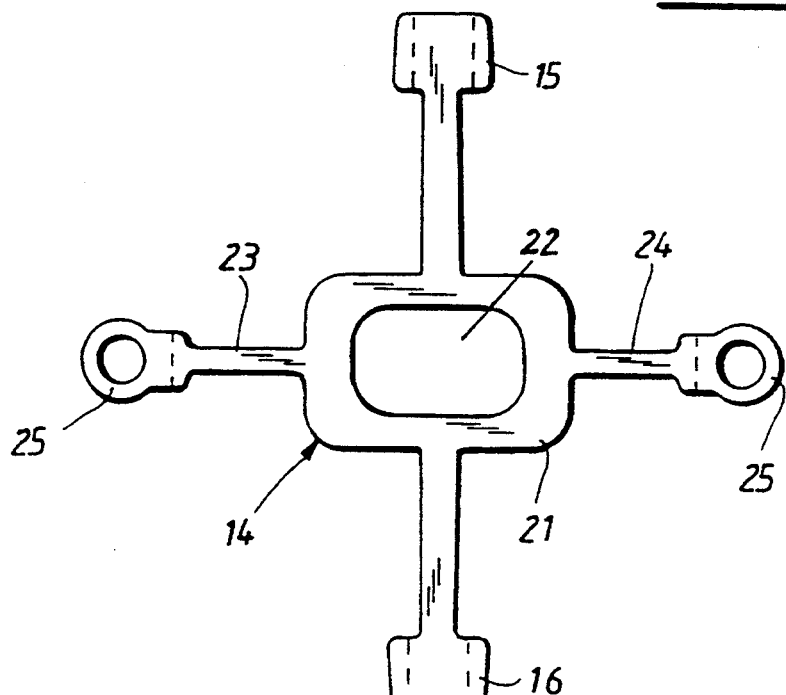
FIG. 4 is a plan view which shows a stamped plate object for a contact element for the float.

The contact element 14 is shown in FIG. 4 as an element stamped out of thin spring steel plate and including a central section 21 with an opening 22 for the rod. Four arms extend outwardly from the central section 21 with an included angle of 90°. Two of these arms 15, 16 form the contact plates whilst the two arms 23, 24 form the suspension means for the contact element on the pins 20 over the float 11. For this purpose, each arm 23, 24 is provided at its remote end with a fastening ring 25 which is arranged to be carried by the pin 20.

Figure 5:
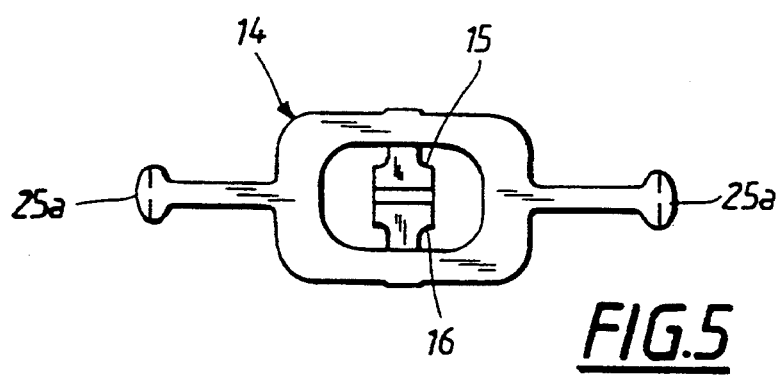
FIG. 5 shows the actual form of the contact element.

FIG. 5 shows the contact element 14 after being bent to its final shape. From this figure it is apparent that each contact plate presents two bent contact parts parallel in a direction towards the rod which have a slightly rounded contact surface of such a length that they extend at least between two adjacent winding loops of the resistance wires on the rod. The outer tips 25a of the fastening rings 25 are bent outwardly a little to simplify the mounting of the contact element on the float pin 20.

Because of the pivotable mounting of the contact element 14 on the float 11, the contact element can rotate about the rotational axis formed by the pins 20 when mass induced side forces arise on the float. In this way the force of the contact plates on the rod is kept equal on both sides of the rod which also offers the advantage that the contact pressure can be lower and the float thereby more easily moved along the rod.

Since the fastening rings 25 are connected to the central region 21 via thin arms 23, 24 a certain elasticity is achieved even in the vertical direction. This is advantageous since vibrations in the vertical direction can be absorbed by the arms 23, 24 without these movements being transmitted to the contact plates 15, 16.

The invention is not restricted to the above described embodiment and several variations are imaginable within the scope of the following claims. For example the rod 10 need not have an oval cross-section.

I claim:

1. A liquid level indicator for monitoring the level of a volume of liquid, comprising:
elongated guide element means having a vertical axis for providing a vertical guide path along the volume of liquid to be monitored; electrically conductive wire means helically arranged on said elongated guide element means with respect to said vertical axis and extending along said vertical guide path of said elongated guide element means; float means arranged for vertical movement along said vertical axis of said elongated guide element means in accordance with varying levels of said volume of liquid to be monitored; a contact element pivotally mounted on said float means about a horizontal axis extending generally transverse to said vertical axis of said elongated guide element means so that said contact element can pivot about said horizontal axis upon exertion of a predetermined force thereon, said contact element being electrically conductive and including at least one contact plate arranged in correspondence with said conductive wire means so that a circuit is formed permitting current to flow therebetween wherein the resistance of said circuit varies with the relative position of said float means as said float means is vertically displaced along said elongated guide element means.

2. The liquid level indicator of claim 1 wherein said contact element is made of a thin metallic plate.

3. The liquid level indicator of claim 1 wherein said float means includes a pair of bearing pins arranged at opposite sides thereof, and wherein said contact element further comprises a pair of fastening rings arranged at opposite sides thereof, said pair of fastening rings being arranged on respective ones of said pair of bearing pins to obtain said pivotable mounting of said contact element on said float means.

4. The liquid level indicator of claim 3 wherein said contact element further comprises a main body and a pair of flexible arms, said pair of flexible arms being electrically conductive and being arranged between opposite sides of said main body and respective ones of said pair of fastening rings.

5. The liquid level indicator of claim 4 wherein each of said pair of fastening rings defines a sized and shaped aperture, each of said apertures having a diameter which is slightly larger than the diameter of the corresponding bearing pins on which said fastening rings are mounted so that said contact element will be permitted to pivot about said horizontal axis upon exertion of a predetermined force thereon.

6. The liquid level indicator of claim 4 wherein said main body of said contact element defines a sized and shaped aperture having a cross-sectional area greater than the cross-sectional area of said elongated guide element means so that said elongated guide element means extends through said aperture of said main body of said contact element.

7. The liquid level indicator of claim 1 wherein said elongated guide element means comprises a rod.

8. The liquid level indicator of claim 7 wherein said rod has an oval cross-section extending in a plane arranged generally transverse to said vertical axis.

9. The liquid level indicator of claim 1 wherein said float means includes rotation prevention means for preventing rotation thereof about said vertical axis.

10. The liquid level indicator of claim 1 wherein said electrically conductive wire means comprises a pair of wires, and wherein said at least one contact plate comprises a pair of contact plates, said pair of contact plates being arranged for electrical connection to respective ones of said pair of wires.

* * * * *